W. S. WITTEN.
DUMPING VEHICLE.
APPLICATION FILED MAY 17, 1911.
1,043,992.
Patented Nov. 12, 1912.
3 SHEETS—SHEET 3.
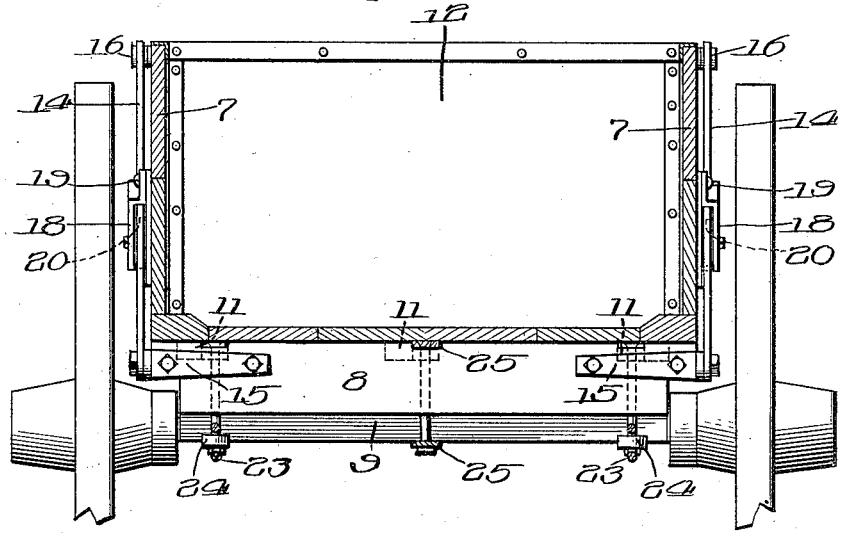
Fig. 4.
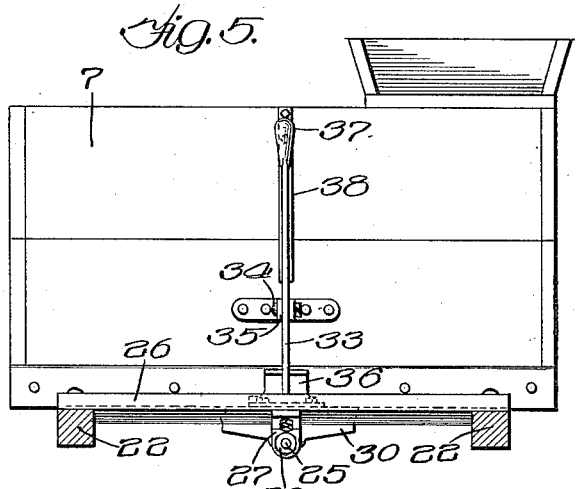
Fig. 5.
Fig. 6.
Witnesses:
Jno. H. Nelson Jr.
M. H. DeBusk
Inventor:
William S. Witten,
by Bond Adams Pickens & Jackson,
Attys.

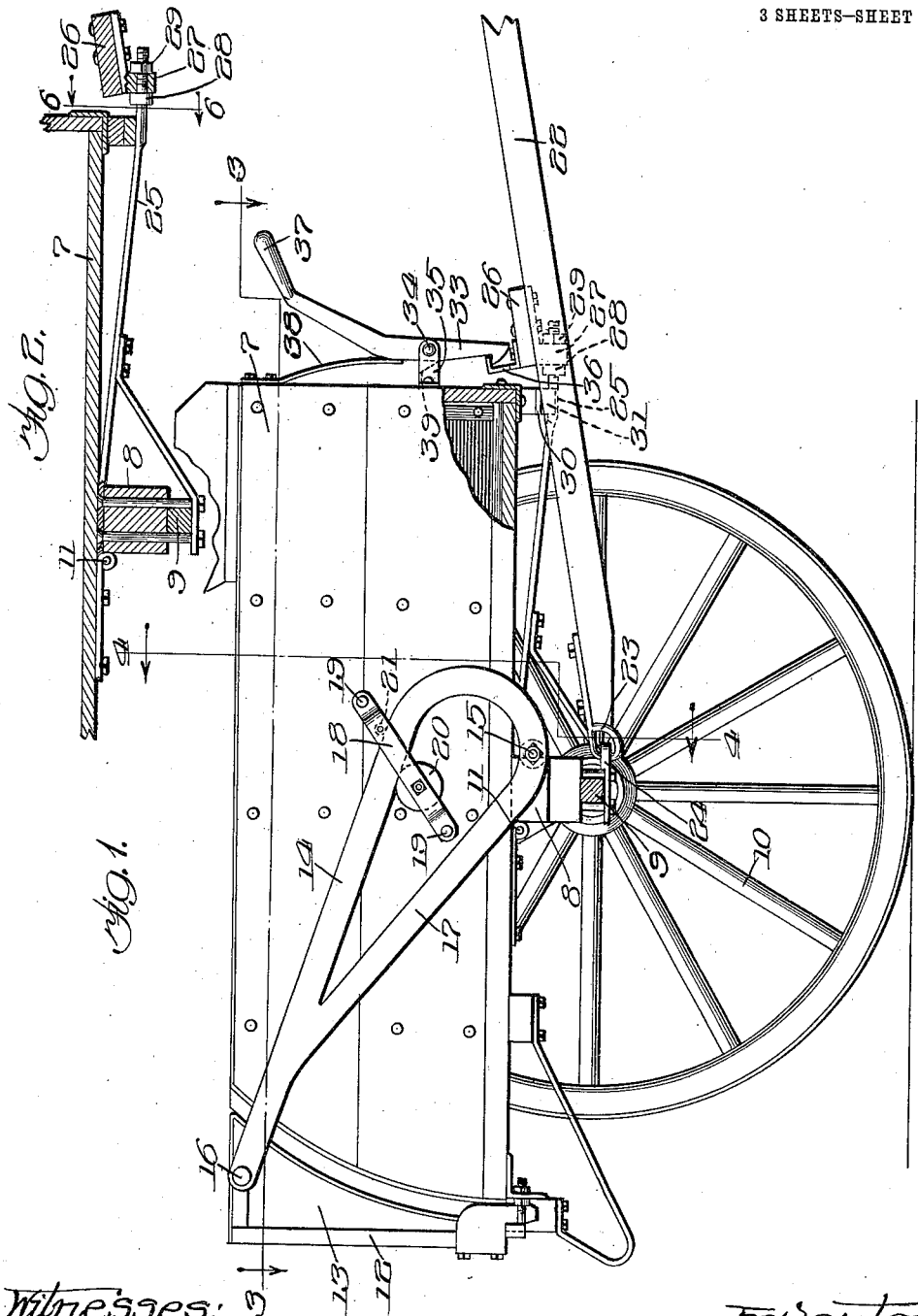

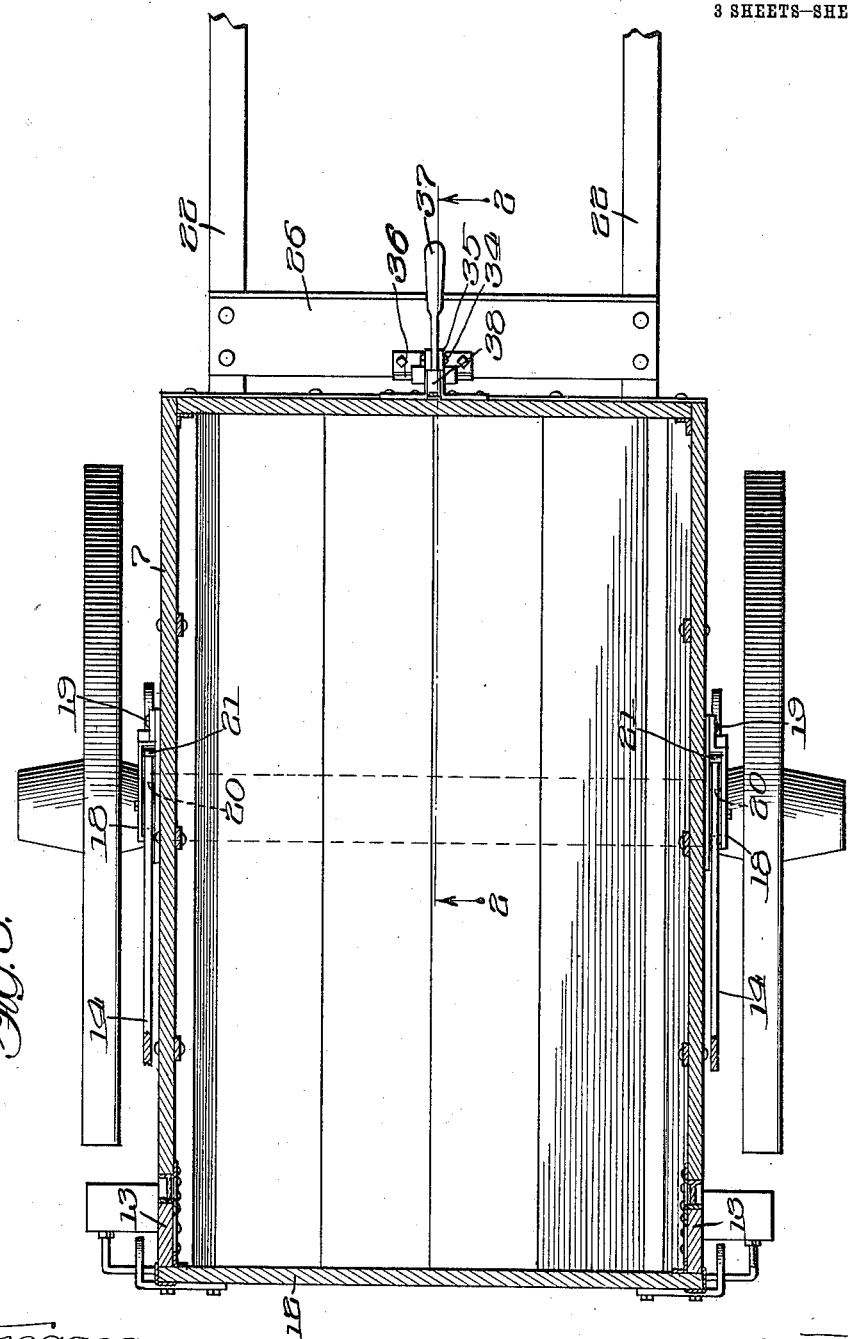

UNITED STATES PATENT OFFICE.

WILLIAM S. WITTEN, OF CHICAGO, ILLINOIS.

DUMPING-VEHICLE.

1,043,992.    Specification of Letters Patent.    Patented Nov. 12, 1912.

Application filed May 17, 1911.  Serial No. 627,842.

*To all whom it may concern:*

Be it known that I, WILLIAM S. WITTEN, a citizen of the United States, residing at Chicago, in the county of Cook and State of Illinois, have invented certain new and useful Improvements in Dumping-Vehicles, of which the following is a specification, reference being had to the accompanying drawings.

My invention relates to dumping vehicles, and in part comprises certain improvements on the vehicle shown and described in my pending application Serial No. 581,683, filed September 12, 1910.

My present improvements have to do more particularly with devices for overcoming horse motion so that the draft animal is relieved of lateral strains and shocks.

To this end my invention comprises the structural features hereinafter pointed out.

In the accompanying drawings,—Figure 1 is a side view of my improved vehicle, one wheel being removed and certain parts being shown in section; Fig. 2 is a detail, being a partial longitudinal section on line 2—2 of Fig. 3; Fig. 3 is a horizontal section on line 3—3 of Fig. 1; Fig. 4 is a vertical cross-section on line 4—4 of Fig. 1; Fig. 5 is a front end view, the shafts being in section; and Fig. 6 is an enlarged detail, being a section on line 6—6 of Fig. 2.

Referring to the drawings,—7 indicates the bed of the vehicle, which, in the illustration, is a two-wheeled cart. Said bed is pivoted at about the longitudinal center thereof upon a bolster 8 mounted on an axle 9 on which the wheels 10 are mounted,—the pivot of the bed being shown at 11 in Fig. 1. The arrangement is such that the bed is adapted to rock about the pivot 11 to discharge the contents thereof at the rear end. As shown in Fig. 1, the rear ends of the sides of the bed are curved.

12 indicates an end-gate having side extensions 13 which aline with the sides of the bed and when in operative position fit closely thereagainst, as described in my pending application Serial No. 483,498, filed March 15, 1909, and in my application Serial No. 581,683 hereinbefore referred to.

14 indicates side bars by which the end-gate is supported when out of operative position and by which it is raised from its operative position when the bed is tilted in dumping. The bars 14 are pivotally connected with the bolster 8 at a point forward of the pivot 11 by pivots 15 and at or near their rear ends are connected with the upper portion of the side extensions 13 of the end-gate by pivots 16. Preferably the forward portions of the bars 14 are made in the form of loops, the lower members 17 of said bars serving as braces to strengthen said bars.

18 indicates straps which extend over the bars 14 and are secured at their ends to the sides of the bed, as shown at 19 in Fig. 1.

20 indicates rollers mounted between the straps 18 and the sides of the bed and bearing against the under margins of the bars 14. 21 indicates rollers also mounted between the straps 18 and the sides of the bed and bearing against the upper margins of the bars 14. The arrangement is such that when the bed is tilted to dump it the rollers 20 operate against the under margins of the bars 14 to lift the same, raising the end-gate out of operative position. The restoration of the bed to its normal position operates to move the bars 14 down and restore the end-gate to operative position. Thus the bars 14 are in effect secured to the axle as the bolster 8 is connected therewith, and the construction of the cart is much simplified as it is not necessary to use a frame.

22 indicates the shafts, which at their rear ends are provided with loops 23 which pass loosely through eyes in plates 24 secured to the axle, as shown in Fig. 1.

25 indicates a rod or bar which is secured at its rear end to the axle 9 and preferably extends under the axle and over the bolster 8, as shown in Fig. 2, so as to provide a secure connection. The rod 25 extends forward centrally of the bed, as shown in Figs. 4 and 6, and is rotatably connected at its front end to a cross-bar 26 secured to the shafts a short distance in front of the bed, as shown in Figs. 1 and 2. The connection between the rod 25 and the cross-bar 26, in the construction shown, is by means of a perforated bearing-plate 27 through which the forward end of the bar 25 passes, said bar being circular in cross-section at that point. Nuts 28—29 screwed upon the forward end of the bar 25 at opposite sides of the bearing-plate 27 serve to connect the parts together and hold them properly in place. The forward portion of the bed rests upon the circular portion of the bar 25, as shown in Fig. 6, it being provided with a pillow-block 30 having a channel formed by lugs 31—32 at the center to receive the bar 25, as shown in Fig. 6. Thus the front portion of the bed is supported upon the bar 25 and the shafts but does not interfere with the rocking of the shafts about a longitudinal axis. The advantage of this construction is that the shafts are left free to rock about a longitudinal axis sufficiently to accommodate the horse motion without correspondingly moving the bed, and, furthermore, the forward portions of the shafts are practically unaffected by rocking movement of the wheels such as is incident to their traveling over rough roads or over obstacles that may be encountered. In carts as heretofore constructed, in which no provision is made for relieving the shafts of such strains, when the wheel at one side rides over an obstacle the shafts are rocked, frequently to such an extent as to very materially affect the horse and interfere with its movement,—in some cases this being so great as to throw the horse. With my improved construction, however, this objection is entirely avoided, so that the cart rides as easily as if it were on springs, and the lateral or rocking motion of the cart in going over rough or stony roads is not transmitted to the horse at all.

The front end of the bed is held down when in operative position by means of a latch 33 pivoted at 34 to a bracket 35 secured at the front of the bed, said latch engaging a stop 36 secured to the cross-bar 26, as shown in Fig. 1. The latch 34 is provided with a handle 37 and is normally held in engagement with the latch 36 by a spring 38 secured to the front of the bed and engaging the latch, as shown in Fig. 1. 39 indicates a stop for limiting the inward movement of the upper portion of the latch and holding the handle 37 out far enough from the bed so that it may be conveniently used by the operator to effect the dumping of the bed.

While I have shown my improvements as applied to a two-wheeled cart, I wish it to be understood that my invention may be also applied to various other types of vehicles.

That which I claim as my invention, and desire to secure by Letters Patent, is,—

1. A vehicle, comprising a bed, a wheeled support therefor, shafts connected at the rear with said wheeled support and adapted to rock slightly about their longitudinal axis, and means connected with said wheeled support and rotatably connected with the shafts between their ends substantially in the longitudinal axis thereof.

2. A dumping vehicle, comprising an axle, wheels mounted thereon, shafts pivotally connected at their rear end portions with the axle, and a member connected with the axle and rotatably connected with the shafts between their ends substantially in the longitudinal axis thereof.

3. A dumping vehicle, comprising an axle, wheels mounted thereon, shafts pivotally connected at their rear end portions with the axle, a member connected with the axle and rotatably connected with the shafts between their ends substantially in the longitudinal axis thereof, and a bed mounted on the axle and supported at its forward end upon said member.

4. A dumping vehicle, comprising an axle, wheels mounted thereon, shafts pivotally connected at their rear end portions with the axle, a bar connected at its rear end with the axle and extending forward and rotatably connected with the shafts substantially in the longitudinal axis thereof, a bed mounted on the axle and supported at its forward end upon said bed, and a pillow-block carried by the bed and adapted to rest upon said bar.

WILLIAM S. WITTEN.

Witnesses:
JOHN L. JACKSON,
MINNIE A. HUNTER.

---

Copies of this patent may be obtained for five cents each, by addressing the "Commissioner of Patents, Washington, D. C."